United States Patent
Cho

(10) Patent No.: US 10,136,030 B2
(45) Date of Patent: Nov. 20, 2018

(54) METHOD AND SYSTEM FOR MANAGING IMAGE FORMING APPARATUS THROUGH NETWORK

(71) Applicant: S-PRINTING SOLUTION CO., LTD., Suwon-si, Gyeonggi-do (KR)

(72) Inventor: Seung-jin Cho, Yongin-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 59 days.

(21) Appl. No.: 15/156,783

(22) Filed: May 17, 2016

(65) Prior Publication Data

US 2016/0259599 A1    Sep. 8, 2016

Related U.S. Application Data

(63) Continuation-in-part of application No. 13/935,796, filed on Jul. 5, 2013, now abandoned.

(30) Foreign Application Priority Data

Jul. 4, 2012   (KR) .................. 10-2012-0073041
Jun. 20, 2013  (KR) .................. 10-2013-0071170

(51) Int. Cl.
   *G06F 11/07*    (2006.01)
   *H04N 1/44*     (2006.01)
   (Continued)

(52) U.S. Cl.
   CPC ....... *H04N 1/4433* (2013.01); *G03G 15/5079* (2013.01); *G06F 11/0733* (2013.01);
   (Continued)

(58) Field of Classification Search
   None
   See application file for complete search history.

(56) References Cited

U.S. PATENT DOCUMENTS 6,742,141 B1 *  5/2004  Miller ................. G06F 11/0748
                                               706/45
6,782,495 B2    8/2004  Bernklau-Halvor
                (Continued)

FOREIGN PATENT DOCUMENTS

CN    102282884 A    12/2011
EP    1341 075       9/2003
            (Continued)

OTHER PUBLICATIONS

European Search Report dated Nov. 18, 2013 in corresponding European Application No. 13174909.5.
(Continued)

*Primary Examiner* — Yolanda L Wilson
(74) *Attorney, Agent, or Firm* — Staas & Halsey LLP

(57) ABSTRACT

A method of managing an image forming apparatus through a network, the method including: logging in to a server through a diagnostic control unit application from a user terminal; receiving, by the user terminal, device information of an image forming apparatus from the image forming apparatus; requesting for and receiving, by the user terminal, diagnostic control unit information corresponding to the received device information from the server; performing a diagnostic control on the image forming apparatus through the diagnostic control unit application by using the received diagnostic control unit information; and uploading results of performing the diagnostic control on the server.

17 Claims, 18 Drawing Sheets

(51) Int. Cl.
*H04N 1/00* (2006.01)
*G03G 15/00* (2006.01)
*G06F 11/22* (2006.01)

(52) U.S. Cl.
CPC ...... *G06F 11/0748* (2013.01); *G06F 11/0793* (2013.01); *G06F 11/2294* (2013.01); *H04N 1/00015* (2013.01); *H04N 1/00029* (2013.01); *H04N 1/00039* (2013.01); *H04N 1/00079* (2013.01); *H04N 1/00244* (2013.01); *H04N 1/00416* (2013.01); *H04N 2201/0039* (2013.01); *H04N 2201/0055* (2013.01); *H04N 2201/0094* (2013.01)

(56) References Cited

U.S. PATENT DOCUMENTS

| | | | |
|---|---|---|---|
| 7,890,318 | B2 | 2/2011 | Castellani et al. |
| 8,694,483 | B2 | 4/2014 | Roulland et al. |
| 8,902,450 | B2 | 12/2014 | Scrafford et al. |
| 2003/0110413 | A1 | 6/2003 | Bernklau-Halvor |
| 2008/0278753 | A1 | 11/2008 | Oda et al. |
| 2008/0294423 | A1* | 11/2008 | Castellani ........... G06F 11/0733 704/4 |
| 2009/0190187 | A1* | 7/2009 | Cornell ................. B41J 29/393 358/474 |
| 2010/0229080 | A1 | 9/2010 | Roulland et al. |
| 2012/0144196 | A1 | 6/2012 | Owen et al. |
| 2012/0144419 | A1 | 6/2012 | Gu et al. |
| 2013/0003109 | A1 | 1/2013 | Kiley |
| 2015/0139014 | A1 | 5/2015 | Montemurro et al. |

FOREIGN PATENT DOCUMENTS

| | | |
|---|---|---|
| JP | 2002-041691 | 2/2002 |
| JP | 2004-214833 | 7/2004 |

OTHER PUBLICATIONS

U.S. Office Action dated Apr. 13, 2015 from U.S. Appl. No. 13/935,796.
U.S. Office Action dated Sep. 29, 2015 from U.S. Appl. No. 13/935,796.
U.S. Advisory Action dated Jan. 11, 2016 from U.S. Appl. No. 13/935,796.
U.S. Office Action dated Feb. 26, 2016 from U.S. Appl. No. 13/935,796.
U.S. Appl. No. 13/935,796, filed Jul. 5, 2013, Seung-jin Cho, Samsung Electronics Co., Ltd.
Chinese Office Action dated Jun. 1, 2017 in related Chinese Application No. 201310279744.7.

* cited by examiner

METHOD AND SYSTEM FOR MANAGING IMAGE FORMING APPARATUS THROUGH NETWORK

CROSS-REFERENCE TO RELATED PATENT APPLICATION

This application is a continuation-in-part and claims priority to U.S. application Ser. No. 13/935,796, filed Jul. 5, 2013, which in turn claims the benefit of Korean Patent Application No. 10-2012-0073041, filed on Jul. 4, 2012, and Korean Patent Application No. 10-2013-0071170, filed on Jun. 20, 2013, in the Korean Intellectual Property Office, the disclosures of which are incorporated herein in their entirety by reference.

BACKGROUND OF THE INVENTION

1. Field of the Invention

The present invention relates to a method of managing an image forming apparatus through a network.

2. Description of the Related Art

Recently, though a variety of image forming apparatuses, such as printers and multi-function devices, are being launched, it is not easy to find a suitable method for dealing with an error of the image forming apparatuses. Specifically, it is difficult for a user to personally solve an error of an image forming apparatus, and a help of a service engineer is required, which takes a lot of time. Information may be provided in manuals or web pages for the user to personally find methods for dealing with various errors, but if information about various types of image forming apparatuses is provided, the user has to look for required information from among a huge amount of information at great inconvenience.

Meanwhile, in response to various requests from users, a development engineer needs to accurately diagnose various errors generated in the act of image forming apparatuses and determine causes for the errors, and obtain various type of information from corresponding raw data.

SUMMARY OF THE INVENTION

The present invention provides a method and system for managing an image forming apparatus through a network.

According to an aspect of the present invention, there is provided a method of managing an image forming apparatus through a network, the method including: logging in to a server through a diagnostic control unit application from a user terminal; receiving, by the user terminal, device information of an image forming apparatus from the image forming apparatus; requesting for and receiving, by the user terminal, diagnostic control unit information corresponding to the received device information from the server; performing a diagnostic control on the image forming apparatus through the diagnostic control unit application by using the received diagnostic control unit information; and uploading results of performing the diagnostic control on the server.

The performing of the diagnostic control may include: receiving a selection on any one of a plurality of modes of the diagnostic control unit application; extracting information for performing the selected mode from the received diagnostic control unit information; receiving a selection on any one of submenus included in the selected mode; receiving detailed information corresponding to the selected submenu from the image forming apparatus; and analyzing the received detailed information based on the extracted information.

The performing of the diagnostic control may include: receiving a selection on anyone of a plurality of modes of the diagnostic control unit application; extracting information for performing the selected mode from the received diagnostic control unit information; receiving a selection on any one of submenus included in the selected mode; and transmitting a command corresponding to the selected submenu to the image forming apparatus by using the extracted information.

According to another aspect of the present invention, there is provided a system for managing an image forming apparatus through a network, the system including: an image forming apparatus; a user terminal in which a diagnostic control unit application for performing a diagnostic control on the image forming apparatus is installed; and a server for providing the diagnostic control unit information to the user terminal, wherein, when the user terminal logs in to the server and transmits device information of the image forming apparatus to the server upon receiving the device information, the server transmits diagnostic control unit information corresponding to the device information to the user terminal, and the user terminal performs a diagnostic control on the image forming apparatus by using the diagnostic control unit information and then uploads results of performing the diagnostic control.

The user terminal, upon receiving a selection on any one of a plurality of modes of the diagnostic control unit application, may extract information for performing the selected mode from the diagnostic control unit information received from the server, and upon receiving a selection on any one of submenus included in the selected mode, may receive detailed information corresponding to the selected submenu from the image forming apparatus and analyze the received detailed information based on the extracted information.

The user terminal, upon receiving a selection on any one of a plurality of modes of the diagnostic control unit application, may extract information for performing the selected mode from the diagnostic control unit information received from the server, and upon receiving a selection on any one of submenus included in the selected mode, may transmit a command corresponding to the selected submenu to the image forming apparatus by using the extracted information.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, one or more embodiments of the present invention will be described in detail with reference accompanying drawings. In order to clearly describe features of the one or more embodiments, descriptions about details that are well known to one of ordinary skill in the art are omitted.

Figure 1:
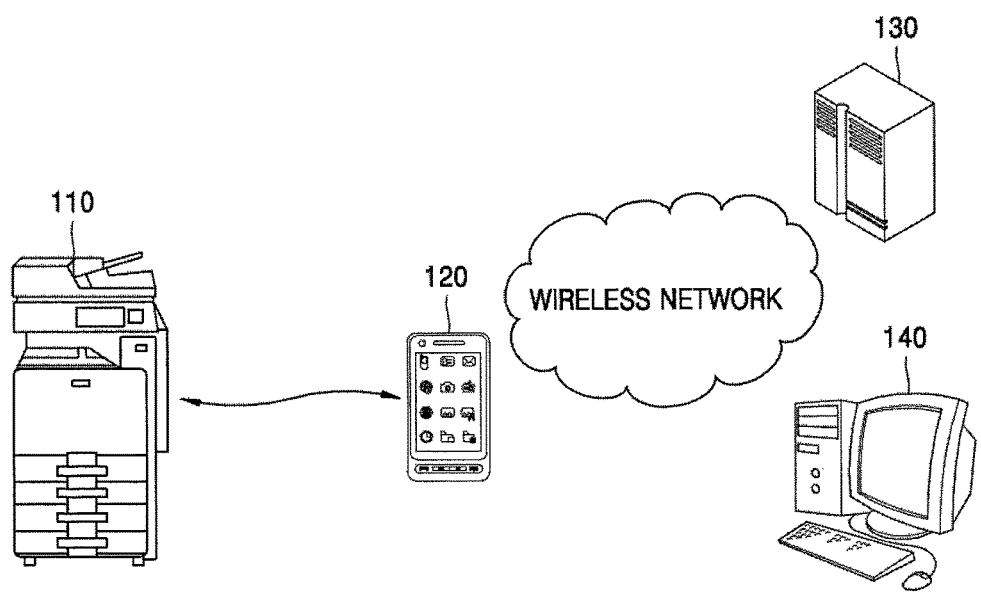
FIG. 1 is a diagram of a usage environment of a system for managing an image forming apparatus through a network, according to an embodiment of the present invention.

FIG. 1 is a diagram of a usage environment of a system for managing an image forming apparatus through a network, according to an embodiment of the present invention. Referring to FIG. 1, the system may include a multi-function device 110, a user terminal 120, a server 130, and a host computer 140. Here, the multi-function device 110 is used as an example of an image forming apparatus, but examples of the image forming apparatus are not limited thereto, and may include a printer, a facsimile, and a scanner. Also, the user terminal 120 may include a terminal device in any form, such as a mobile phone or a laptop, which is capable of executing a diagnostic control unit (DCU) application for diagnosing and managing the multi-function device 110, and providing an interface enabling a user to execute and manipulate the DCU application.

Here, the DCU application denotes an application for controlling operations related to diagnosing and managing the multi-function device 110. The DCU application provides details and corrective measures of an error generated in the multi-function device 110 to the user, and supports a test function for determining a normal operation of the multi-function device 110. Also, various types of information about the multi-function device 110 may be checked through the DCU application.

According to one or more embodiments, the DCU application supports five modes, i.e., an error mode, a diagnosis mode, a test mode, an information mode, and a service mode. In the error mode, details and corrective measures of an error generated in the multi-function device 110 are provided to the user, or histories of errors/corrective measures or statistics related to errors/corrective measures are provided to the user. In the diagnosis mode, a normal operation of each unit of the multi-function device 110 is notified. In the test mode, a test printing of a sample pattern is supported to determine whether the multi-function device 110 normally operates. In the information mode, various types of information related to the multi-function device 110 are provided for the user to check, or a guide related to firmware downloading is provided. In the service mode, a service, such as cloning of a setting of the multi-function device 110 or externally transmitting of a debug log of the multi-function device 110 is provided.

Referring to FIG. 1, the multi-function device 110 and the user terminal 120 may be connected to each other via wires, such as a universal serial bus (USB) cable, or wirelessly through Wi-Fi or Wi-Fi direct. The multi-function device 110 and the user terminal 120 may transfer commands and data between each other by using an extensible markup language (XML) interface via a wired or wireless connection, or by using another interface. The user terminal 120 is connected to the server 130 through a wireless communication network. Here, the wireless communication network between the user terminal 120 and the server 130 may be realized in a near field wireless communication, such as Wi-Fi, or a cellular data communication, such as 3G or long term evaluation (LTE).

The user terminal 120 executes the DCU application, and performs a diagnostic control on the multi-function device 110 by transmitting and receiving data to and from the multi-function device 110 and the server 130. A process of the diagnostic control will be described in detail later. After the diagnostic control using the DCU application is performed, the user terminal 120 uploads results of performing the diagnostic control in the server 130.

The results of performing the diagnostic control are accumulated in the server 130, and may be used as raw data for information analysis later. For example, when the host computer 140 requests the server 130 for an error state according to models of a multi-function device, a monthly error state, an analysis on units of an image forming apparatus, a state according to product groups, and an analysis according to monthly productions, the server 130 may perform the request by using the accumulated raw data and provide results of the request to the host computer 140.

Figure 2:
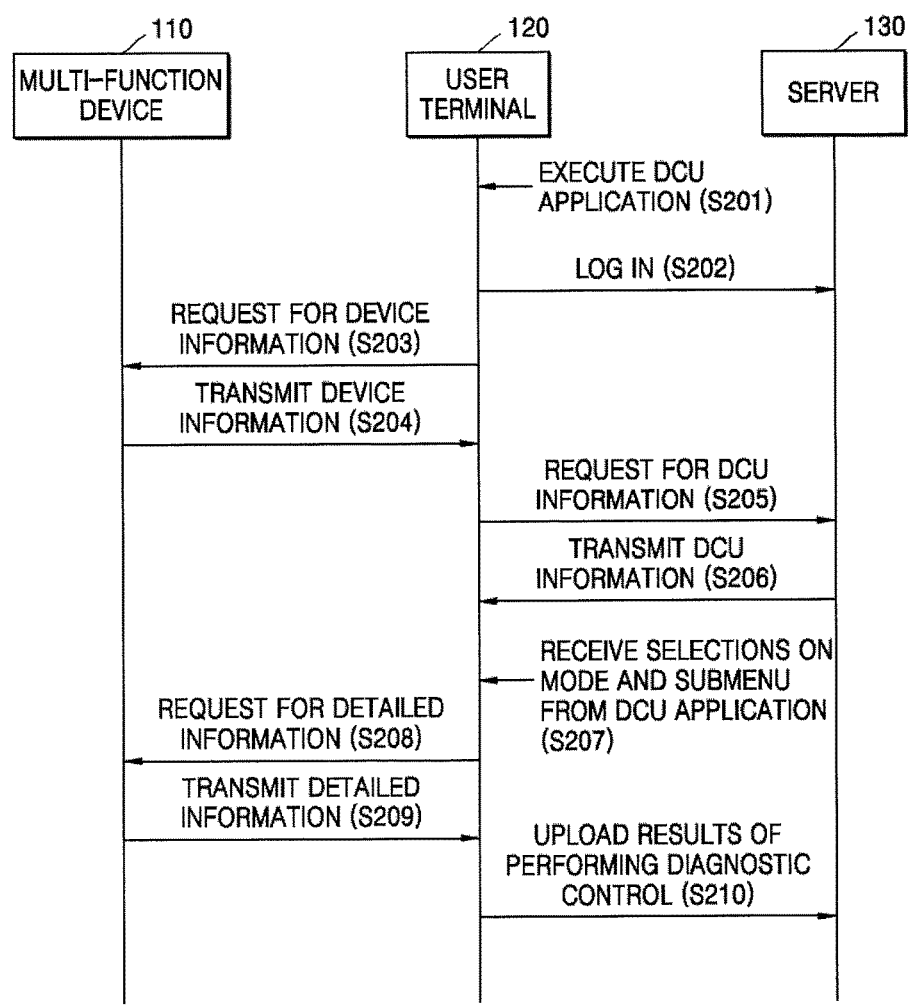
FIG. 2 is a flowchart illustrating diagnostic control processes of a multi-function device, according to an embodiment of the present invention.

Processes for performing the diagnostic control on the multi-function device 110 will now be described in detail with reference to FIG. 2. FIG. 2 is a flowchart illustrating diagnostic control processes of the multi-function device 110, according to an embodiment of the present invention.

Referring to FIG. 2, when the user terminal 120 executes the DCU application in operation S201, the server 130 is logged in via user authentication in operation S202. Here, the user authentication may be performed by receiving a user identification (ID) and a password on the DCU application from the user, and checking whether the received user ID and password match those stored in the server 130. If the user is a general user, the user authentication may be performed by using information provided during user registration after the multi-function device 110 is purchased, and if the user authentication is limited to a specific user, access authority may be granted only to the specific user through a web server.

Once the server 130 is logged in after succeeding the user authentication, the user terminal 120 requests the multi-function device 110 for device information of the multi-function device 110 in operation S203, and in response to the request, the multi-function device 110 transmits the device information to the user terminal 120 in operation S204.

Here, the device information denotes a series of information related to the multi-function device 110, for example, a device capability, a configuration, an engine diagnostic control (EDC) code, count information, error information, supplies information, and engine margin information.

Upon receiving the device information, the user terminal 120 requests the server 130 for DCU information in operation S205 based on the received device information, and the server 130 transmits the DCU information to the user terminal 120 in response to the request in operation S206.

Here, the DCU information denotes information required for the DCU application to perform the diagnostic control on the multi-function device 110. In other words, the DCU information is information required to perform each mode of the DCU application. The DCU information differs according to devices on which a diagnostic control is to be performed. Accordingly, in order to obtain the DCU information, the device information of the multi-function device 110 currently connected to the user terminal 120 is required. When the user terminal 120 requests for the DCU information based on the received device information, the server 130 transmits the DCU information corresponding to the device information to the user terminal 120.

The DCU information may include a database about details and corrective measures of errors corresponding to various error codes, sample patterns for test printings, information for diagnosing each unit of a multi-function device, and various types of information related to a multi-function device. The DCU application may perform each mode of the DCU application by using the DCU information.

Upon receiving the DCU information, the DCU application stores the DCU information, and the DCU application receives a selection on a mode and a selection on a submenu included in the selected mode from the user in operation S207. Modes and submenus included in each mode of the DCU application will be described in detail later.

Once the mode and the submenu to be performed in the DCU application are selected, the user terminal 120 may request the multi-function device 110 for detailed information for performing the diagnostic control corresponding to the selected mode and submenu in operation S208, the multi-function device 110 may transmit the detailed information to the user terminal 120 in response to the request in operation S209. The DCU application performs the diagnostic control on the multi-function device 110 by using the received detailed information.

At this time, in a certain mode of the DCU application, the user terminal 120 may not request for the detailed information to the multi-function device 110 but may instruct the multi-function device 110 to perform a certain diagnostic control operation. For example, when the mode selected in the DCU application is the error mode, an error code is requested as the detailed information to the multi-function device 110, but when the selected mode is the test mode, the user terminal 120 transmits a sample pattern included in the DCU information received from the server 130 to the multi-function device 110 and instructs the multi-function device 110 to perform a test printing. In other words, operations S208 and S209 may be omitted according to a mode of the DCU application.

Once the diagnostic control is performed on the multi-function device 110 by the DCU application, the user terminal 120 uploads results of performing the diagnostic control to the server 130 in operation S210. The uploaded results may be used as raw data for analyzing information about an error or the like later.

Figure 3:
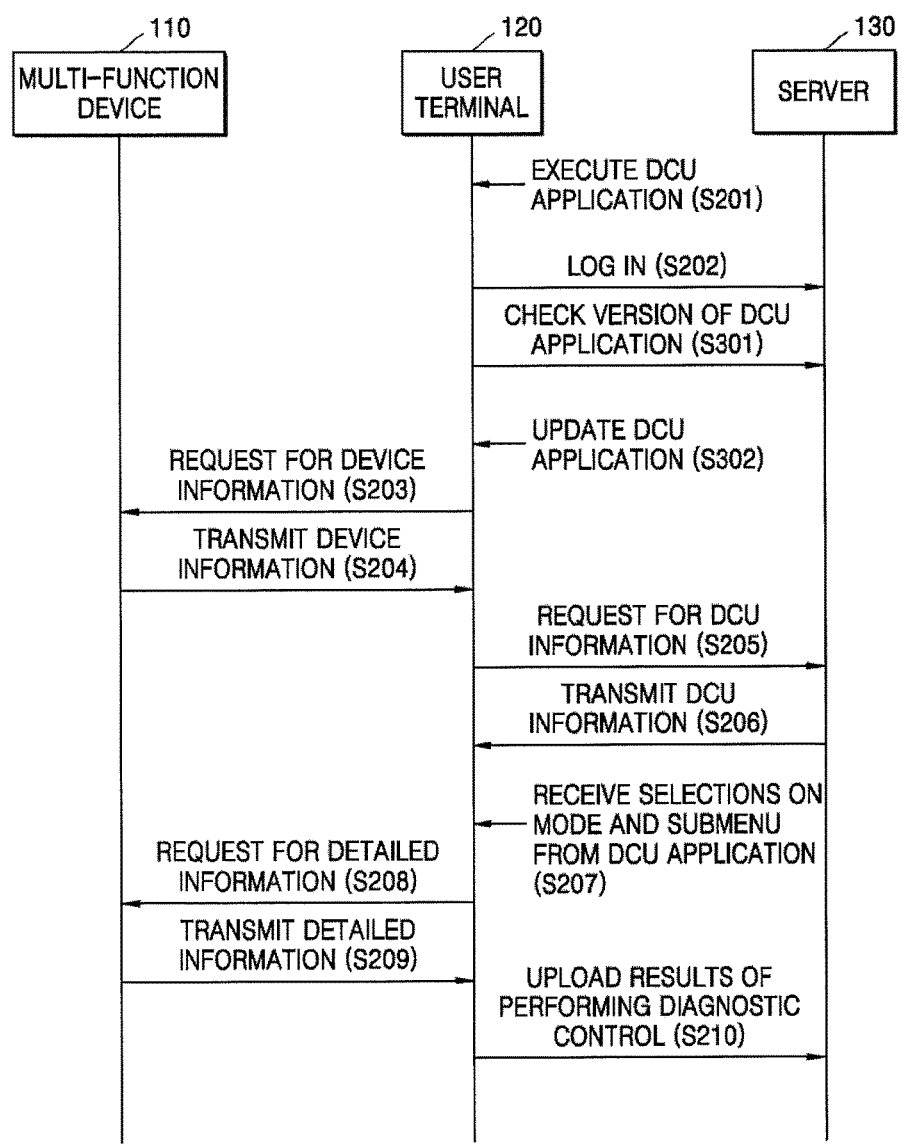
FIG. 3 is a flowchart illustrating diagnostic control processes of a multi-function device, according to another embodiment of the present invention.

When a version of the DCU application installed in the user terminal 120 does not match a version supported by the server 130, the DCU application may be automatically updated, as shown in FIG. 3.

FIG. 3 is a flowchart illustrating diagnostic control processes of the multi-function device 110, according to another embodiment of the present invention. The diagnostic processes of FIGS. 2 and 3 are the same in operations S201 through S210, except that operations S301 and S302 are added between operations S202 and S203 in FIG. 3. When the logging in is completed, the user terminal 120 checks the version of the DCU application in operation S301. In other words, the user terminal 120 requests the server 130 for version information of the DCU application that is currently supported, and the server 130 transmits the version information to the user terminal 120 in response to the request.

The user terminal 120 determines whether the version received from the server 130 matches the version of the DCU application currently executed in the user terminal 120, and when the versions do not match, automatically updates the DCU application in operation S302. Since operations S201 through S210 of FIG. 3 are the same as those of FIG. 2, details thereof are not repeated.

Figure 4:
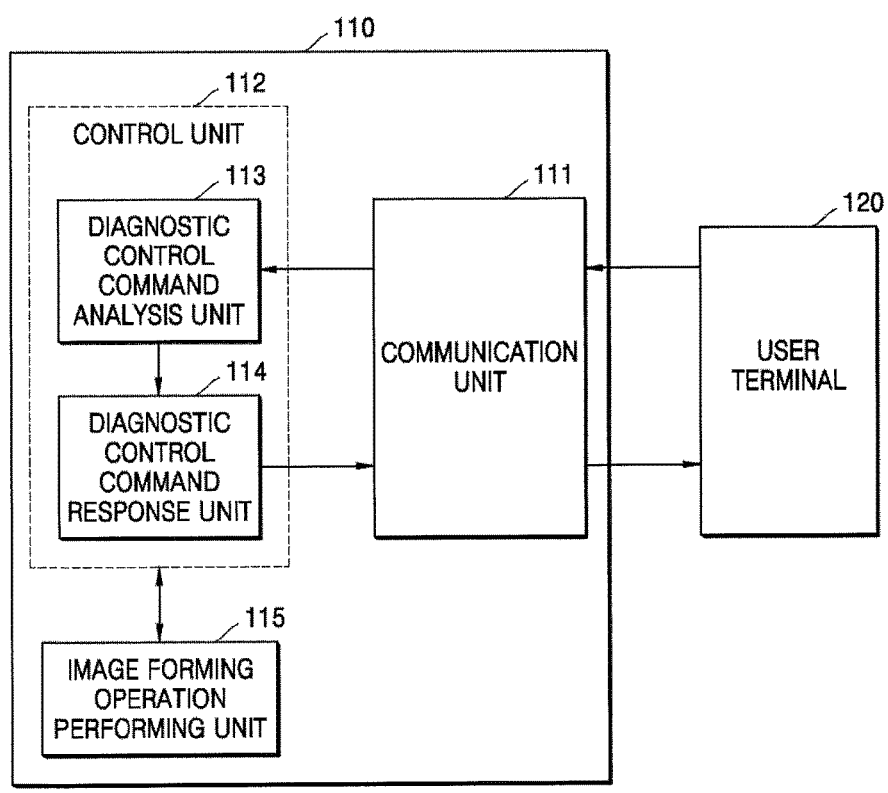
FIG. 4 is a block diagram of a multi-function device for performing a method of managing an image forming apparatus through a network, according to an embodiment of the present invention.

FIG. 4 is a block diagram of the multi-function device 110 for performing a method of managing an image forming apparatus through a network, according to an embodiment of the present invention. Referring to FIG. 4, the multi-function device 110 may include a communication unit 111, a control unit 112, and an image forming operation performing unit 115, wherein the control unit 112 may include a diagnostic control command analysis unit 113 and a diagnostic control command response unit 114.

Upon receiving a diagnostic control command from the user terminal 120, the communication unit 111 may transmit the diagnostic control command to the diagnostic control command analysis unit 113 of the control unit 112. When the diagnostic control command analysis unit 113 analyzes and transmits the diagnostic control command to the diagnostic control command response unit 114, the diagnostic control command response unit 114 transmits detailed information corresponding to the diagnostic control command to the user terminal 120 through the communication unit 111, or controls the image forming operation performing unit 115 to perform an operation corresponding to the diagnostic control command.

For example, when the diagnostic control command requesting for an error code of an error generated in the multi-function device 110 is received, the diagnostic control command analysis unit 113 may analyze the diagnostic control command and notify the diagnostic control command response unit 114 that the diagnostic control command requesting for the error code has been received. Then, the diagnostic control command response unit 114 transmits the error code to the user terminal 120 through the communication unit 111. Here, if two or more errors are simultaneously generated, two or more corresponding error codes are all transmitted.

Alternatively, when the diagnostic control command requesting to diagnose each unit of the multi-function device 110 is received, the diagnostic control command analysis unit 113 analyzes the diagnostic control command and notifies the diagnostic control command response unit 114 that the diagnostic control command requesting to diagnose each unit has been received. Then, the diagnostic control command response unit 114 diagnoses each unit of the multi-function device 110, and transmits results of the diagnosis to the user terminal 120 through the communication unit 111.

Alternatively, when the diagnostic control command requesting for a test printing of a sample pattern is received, the diagnostic control command analysis unit 113 analyzes the diagnostic control command and notifies the diagnostic control command response unit 114 that the diagnostic control command requesting for a test printing has been received. Then, the diagnostic control command response unit 114 controls the image forming operation performing unit 115 to perform the test printing according to the sample pattern.

FIGS. 5A through 5E illustrate screens 310 through 350 of the user terminal 120 in which a DCU application is executed, according to embodiments of the present invention. (도면에 5B-5E 에 부재번호 310 를 각각 320-350 으로 수정바람

Figure 5A:
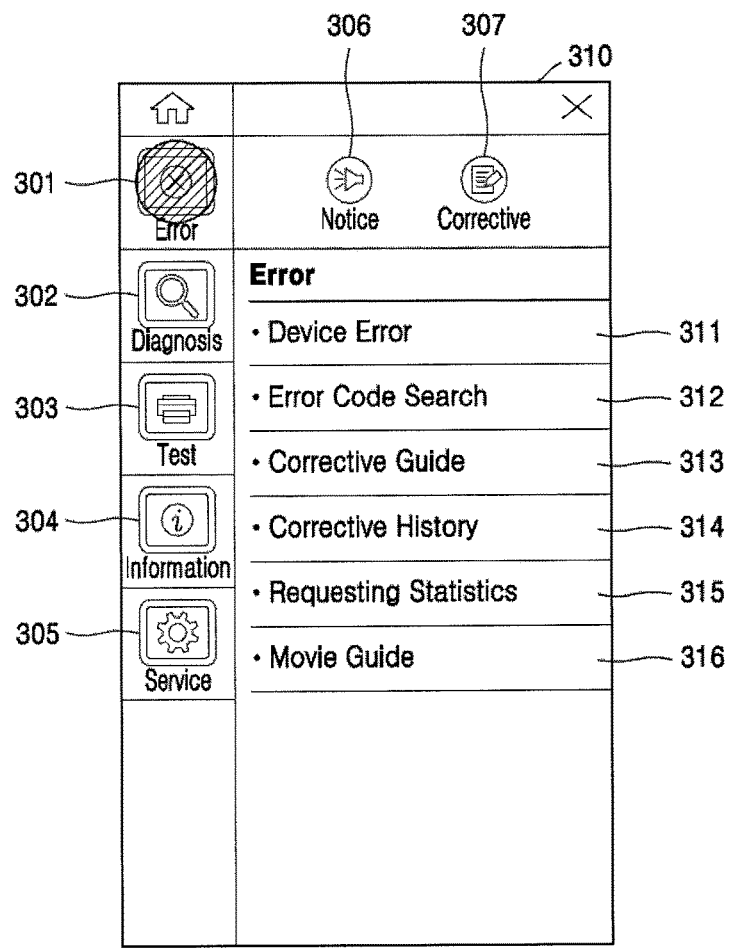
FIGS. 5A through 5E illustrate screens of a user terminal in which a diagnostic control unit (DCU) application is executed, according to embodiments of the present invention.

In FIG. 5A, the screen 310 in which an error mode 301 is selected from among a plurality of modes of the DCU application. When a DCU application is executed, a user interface for selecting any one of a plurality of modes is provided on a screen. Icons of the error mode 301, a diagnosis mode 302, a test mode 303, an information mode 304, and a service mode 305 are formed, and a user may select, for example touch one of the icons to select a mode. When the mode is selected, submenus corresponding to the selected mode are shown. Referring to FIG. 5A, when the error mode 301 is selected, submenus, such as device error 311, error code search 312, corrective guide 313, corrective history 314, requesting statistics 315, and movie guide 316, are generated.

FIGS. 5B through 5E illustrate the screens 320 through 350 displaying submenus when the diagnosis mode 302, the test mode 303, the information mode 304, and the service mode 305 are respectively selected.

Operations of the system according to selecting a mode and a submenu will now be described with reference to FIGS. 1 through 4 and FIGS. 5A through 5E.

First, operations of the system in the error mode 301 will be described with reference to FIG. 5A. When the user selects the error mode 301 through the screen 310 displayed on the user terminal 120 in operation S207 of FIG. 2, and selects the device error 311 from among the submenus, the user terminal 120 may check an error generated in the multi-function device 110 and display the error. Accordingly, the user terminal 120 transmits the diagnostic control command requesting for an error code of an error generated in the multi-function device 110 to the multi-function device 110. The multi-function device 110 transmits an error code of a current error to the user terminal 120 in response to the request. The user terminal 120 may check details of the error corresponding to the received error code by using an error code-related database included in the DCU information received from the server 130, and display the error.

Here, the error code transmitted from the multi-function device 110 to the user terminal 120 may be in a combination of characters and numbers.

When the error code search 312 is selected in FIG. 5A, the user terminal 120 may display an error code corresponding to the error generated in the multi-function device 110. The user terminal 120 may transmit a diagnosis control command requesting for the error code to the multi-function device 110, and receive the error code from the multi-function device 110.

When the corrective guide 313 is selected in FIG. 5A, the user terminal 120 may display corrective measures regarding the error generated in the multi-function device 110. The user terminal 120 may check the corrective measures regarding the error corresponding to the error code received from the multi-function device 110, by using the error code-related database included in the DCU information received from the server 130. Meanwhile, the user terminal 120 may also receive, from the server 130, and display information about materials/supplies required according to the corrective measures.

When the corrective history 314 is selected in FIG. 5A, the user terminal 120 may display a corrective history performed before. The corrective history may be stored in the server 130, and then transmitted to the user terminal 120 during a search. The corrective history may be searched according to devices, models, service engineers, or parts having a disorder.

When the requesting statistics 315 is selected in FIG. 5A, the user terminal 120 may display statistics information related to the errors/corrective measures. For example, a trend of generation of monthly errors or an order of generation frequencies of errors may be displayed. The user terminal 120 may receive such statistics information from the server 130. Meanwhile, the statistics information may be provided only when a user who requested for the statistics information has authority.

When the movie guide 316 is selected in FIG. 5A, the user terminal 120 may reproduce a video guiding the errors/corrective measures. For example, a list of corrective measures that may be taken with respect to an error currently generated, and when the user selects one of the corrective measures, a video corresponding to the selected corrective measures may be displayed. The video is stored in the server 130 and transmitted to the user 120 when requested, and the user terminal 120 may store the video.

Meanwhile, when the user selects a notice menu 306, the mobile terminal 120 may display a notice related to diagnosis control of the multi-function device 110 on the screen. The user may conveniently upload details about a corrective measure taken with respect to an error to the server 130 by selecting a corrective menu 307.

For example, when the user checks the error through the DCU application, takes a corrective measure on the error, and then selects the corrective menu 307, a screen for inputting the corrective measure taken with respect to the multi-function device 110 is displayed on a screen of the user terminal 120. When the user inputs the corrective measure to the screen of the user terminal 120, the user terminal 120 transmits the input corrective measure and the details about the error generated in the multi-function device 10 to the server 130, and the server 130 stores the corrective measure. Corrective measures uploaded as such may be used while analyzing various pieces of information later. Here, the user may upload a corrective measure by using at least one of text, a photo, and a video. For example, the user may input the corrective measure in text, or upload a photograph or a video of processes of the corrective measure.

Figure 5B:
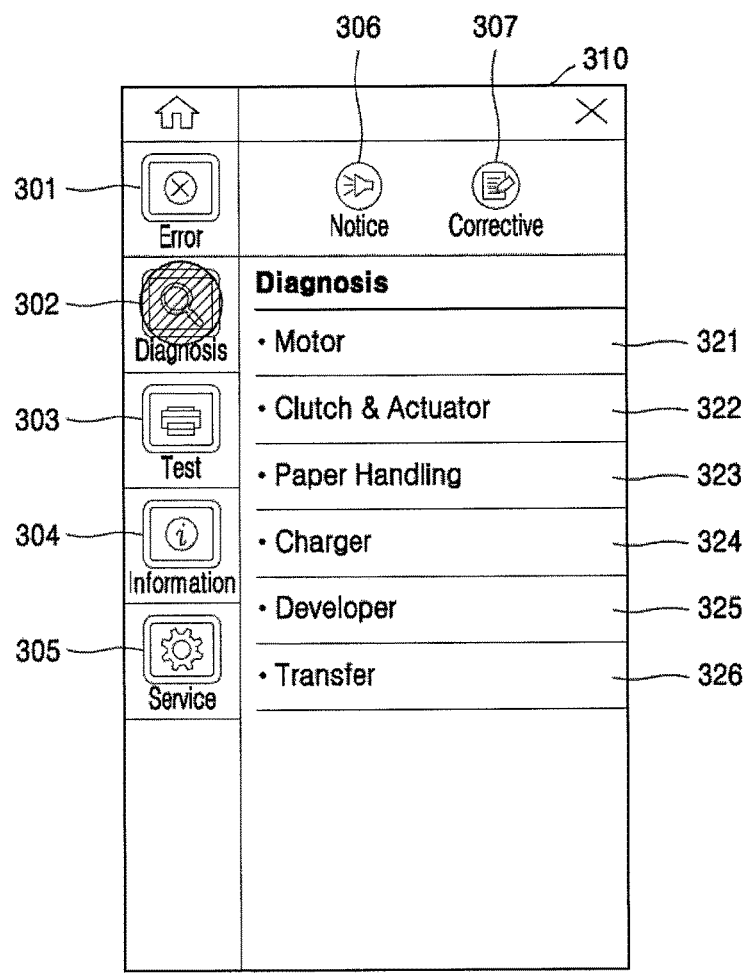

Second, operations of the system in the diagnosis mode 302 will be described with reference to FIG. 5B. Submenus corresponding to the diagnosis mode 302 respectively correspond to units in the multi-function device 110 or operations performed by the multi-function device 110. For example, the submenus for diagnosing operations a motor 321, a clutch & actuator 322, a paper handling operation 323, a charger 324, a developer 325, and a transfer 326 are provided. When the user selects the diagnosis mode 302 through the screen 320 of the user terminal 120 in operation S207 of FIG. 2, and selects a submenu corresponding to a unit to be diagnosed, the user terminal 120 transmits a diagnostic control command requesting to diagnose the corresponding unit to the multi-function device 110. Here, the user terminal 120 also transmits information required to diagnose each unit of the multi-function device 110 from among the DCU information received from the server 130. In detail, the DCU information may include a database about an entire diagnosis list provided by an engine supported by the multi-function device 110.

For example, during the diagnosis mode 302 of the DCU application, an engine margin sensing function, wherein whether a jam is generated or is capable of being generated is determined via an average and a standard deviation while a printing medium passes through a printing section by analyzing a timing between sensors in the printing section. In order to realize the engine margin sensing function, information about whether the multi-function device 110 includes sensors, locations of the sensors, and a normal paper transfer speed in the multi-function device 110 is required. The DCU information includes such information.

In response to the diagnostic control command requesting diagnosis, the multi-function device 110 diagnoses the unit corresponding to the selected submenu, and transmits results of the diagnosis to the user terminal 120.

Upon receiving the results of diagnosis, the user terminal 120 displays the results for the user to check, and uploads the results to the server 130. The results uploaded in the server 130 may be used to analyze information about an error later.

Figure 5C:
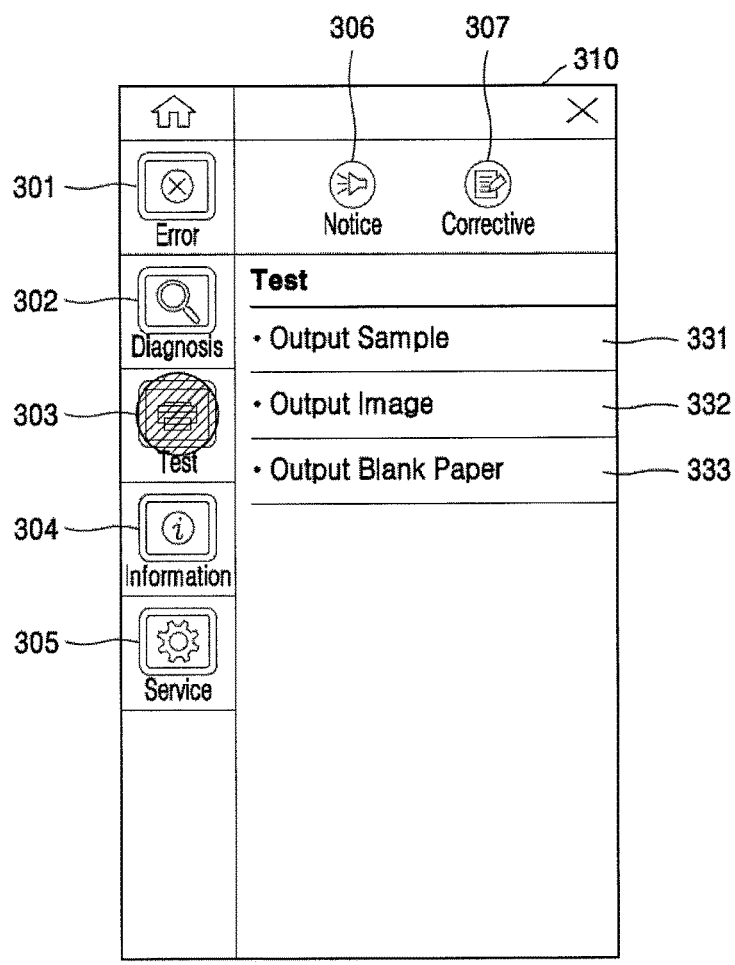

Third, operations of the system in the test mode 303 will be described with reference to FIG. 5C. Submenus 331 through 333 corresponding to the test mode 303 of FIG. 5C are menus for performing a test printing. When output sample 331 is selected, the user terminal 120 transmits a diagnostic control command requesting to output a sample to the multi-function device 110. Also, the user terminal 120 transmits a sample pattern for a test printing included in the DCU information received from the server 130 to the multi-function device 110 together with the diagnostic control command. Upon receiving the diagnostic control command and the sample pattern, the multi-function device 110 performs the test printing of the sample pattern.

When output image 332 is selected in the test mode 303, the user terminal 120 transmits a diagnostic control command requesting a test printing according to colors of cyan (C), magenta (M), yellow (Y), and black (K) to the multi-function device 110, and upon receiving the diagnostic control command, the multi-function device 110 performs the test printing.

When output blank paper 333 is selected, the user terminal 120 transmits a diagnostic control command requesting to output a blank paper to the multi-function device 110, and upon receiving the diagnostic control command, the multi-function device 110 outputs a blank paper.

Figure 5D:
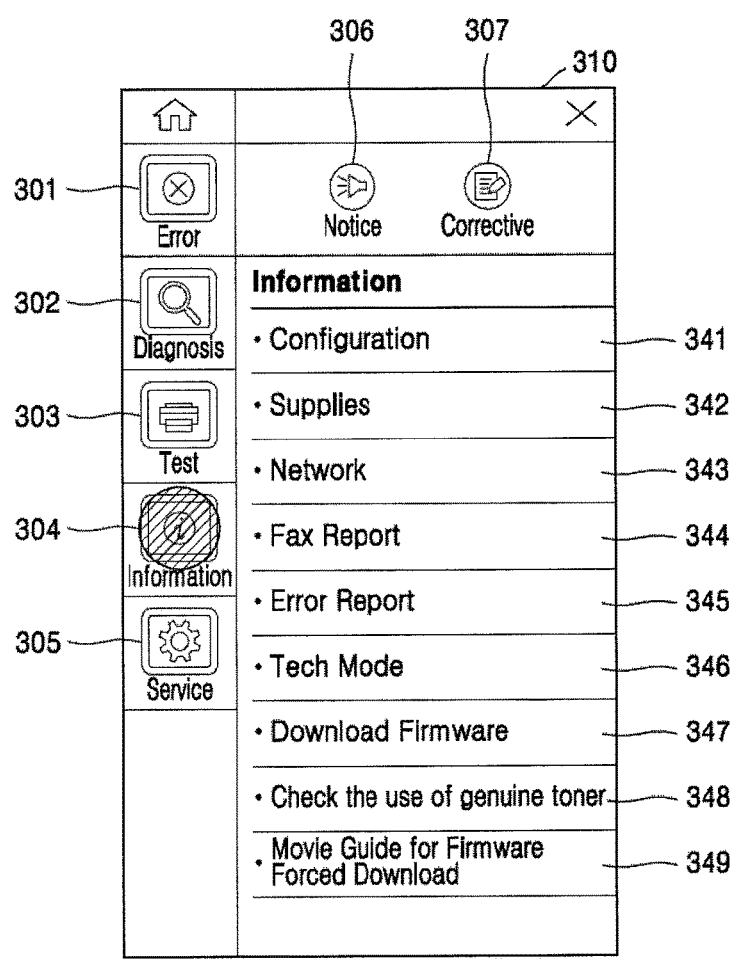

Fourth, operations of the system in the information mode 304 will be described with reference to FIG. 5D. Submenus corresponding to the information mode 304 of FIG. 5D are menus for checking various types of information of the multi-function device 110 or for providing a guide related to firmware downloading. When any one of the submenus is selected, the user terminal 120 extracts required information from the device information received in operation S204 or the DCU information received in operation S206 of FIG. 2 and displays the required information on a screen, or if required, requests the multi-function device 110 for the detailed information and displays the detailed information on a screen.

For example, when a configuration 341 is selected, the user terminal 120 extracts information about a configuration from the device information received in operation S204 of FIG. 2, and displays the information on a screen. The system operations in the similar manner for the other submenus so that various types of information of the multi-function device 110 are checked. As such, the user may conveniently check the various types of information of the multi-function device 110 via the user terminal 120.

When supplies menu 342 is selected, the user terminal 120 may display information about supplies included in the multi-function device 110 on the screen. For example, the user terminal 120 may display residual amounts, replacement cycles, and next replacement times of the supplies on the screen.

When a network menu 343 is selected, the user terminal 120 may display information about a network state of the multi-function device 110 and the server 130 on the screen.

When the fax report menu 344 is selected, the user terminal 120 may display information of the multi-function device 110, such as facsimile exchange records, facsimile protocol dumps, or facsimile diagnosis reports, on the screen.

When an error report menu 345 is selected, the user terminal 120 may display information about an error pre-generated and a corrective measure on the screen.

When a tech mode menu 346 is selected, the user terminal 120 may display information for technical support on the screen.

When a download firmware menu 347 is selected, the user terminal 120 installs new firmware in the multi-function device 110. For example, the user terminal 120 may receive firmware from the server 130 and transmit the firmware to the multi-function device 110 such that the firmware is installed in the multi-function device 110.

When a check the use of genuine toner menu 348 is selected, the user terminal 120 may determine whether the multi-function device 110 is using genuine toner and display a result of the determining on the screen.

When a movie guide for firmware forced download menu 349 is selected, the user terminal 120 may reproduce a video guiding the user how to perform firmware forced download. Even when the multi-function device 110 is not in a normal state, firmware may be forcibly downloaded to resolve an error. However, the user may not know how to perform firmware forced download and may overreact by replacing a main board despite that an error is solvable by downloading firmware. However, by providing the video guiding the user how to perform firmware forced download, the user may download the firmware to solve the error. The video may be stored in the server 130 and transmitted to the user terminal 120 when requested, and the user terminal 120 may store the video.

Figure 5E:
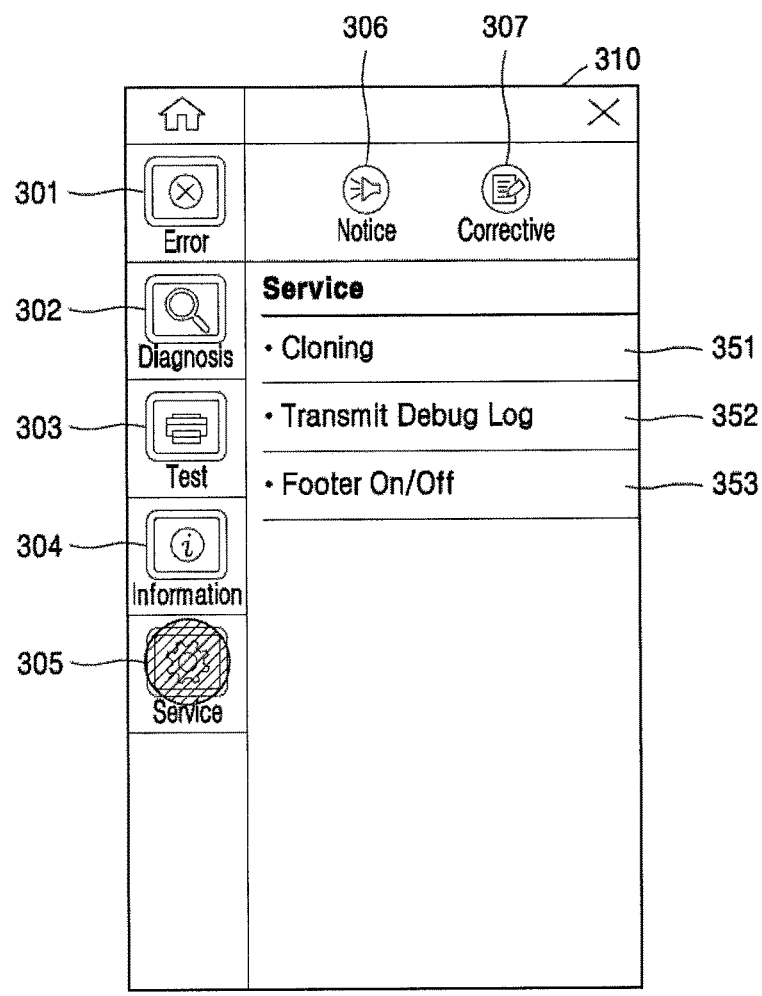

Fifth, operations of the system in the service mode 305 will be described with reference to FIG. 5E. Submenus displayed on FIG. 5E include a cloning menu 351, a transmit debug log menu 352, and a footer on/off menu 353.

When the cloning menu 351 is selected, settings of the multi-function device 110 may be temporarily stored in the user terminal 120, and applied gain to the multi-function device 110 later. The cloning menu 351 includes an export mode and an import mode. When the export mode is selected, the multi-function device 110 transmits current setting values to the user terminal 120, and the user terminal 120 stores the received setting values. When the import mode is selected, the user terminal 120 transmits the stored setting values pre-received from the multi-function device 110 to the multi-function device 110, and the multi-function device 110 applies the received setting values. For example, the cloning menu 351 may be used when a main board of the multi-function device 110 needs to be replaced byt setting values are unable to be stored in the multi-function device 110 since the multi-function device 110 does not have a separate storage space.

When the transmit debug log menu 352 is selected, the multi-function device 110 transmits a debug log to the user terminal 120. Here, a debug log is information related to error correction records in the multi-function device 110. The user terminal 120 may directly analyze/store the debug log, or request the server 130 to analyze/store the debug log while transmitting the debug log to the server 130.

When the footer on/off menu 353 is selected, a function of displaying setting values of the multi-function device 110, such as print options, on a print output from the multi-function device 110 as a footer may be turned on/off.

An example of actually using such five modes will now be described. When an error is generated in a multi-function device, a user may execute an error mode so as to check details about the error and corrective measures of the error in a user terminal and perform corrective measures. Before and after performing the corrective measures, the user may execute a diagnosis mode to check whether each unit of the multi-function device normally operates. After performing the corrective measures, a test printing may be performed in a test mode so as to test whether the multi-function device normally operates. Also, the user may execute an information mode at any time to check various types of information of the multi-function device, such as setting information, supplies information, and network information.

FIGS. 6A through 6D are diagrams showing results of analyzing results of performing a diagnostic control accumulated in a server, according to a method of managing an image forming apparatus through a network, according to embodiments of the present invention.

Figure 6A:
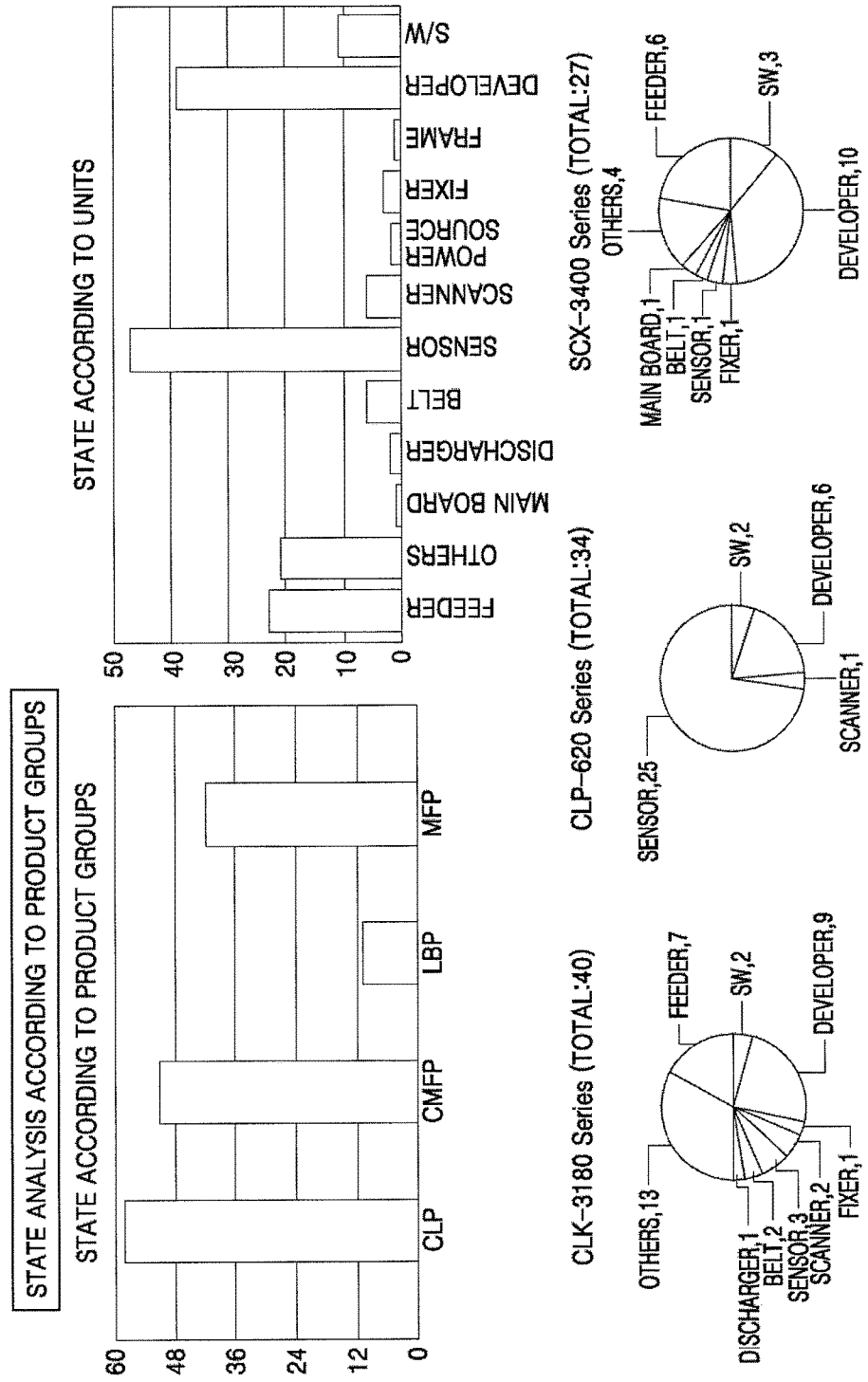
FIGS. 6A through 6D are diagrams showing results of analyzing results of performing a diagnostic control accumulated in a server, according to a method of managing an image forming apparatus through a network, according to embodiments of the present invention.
Figure 6B:
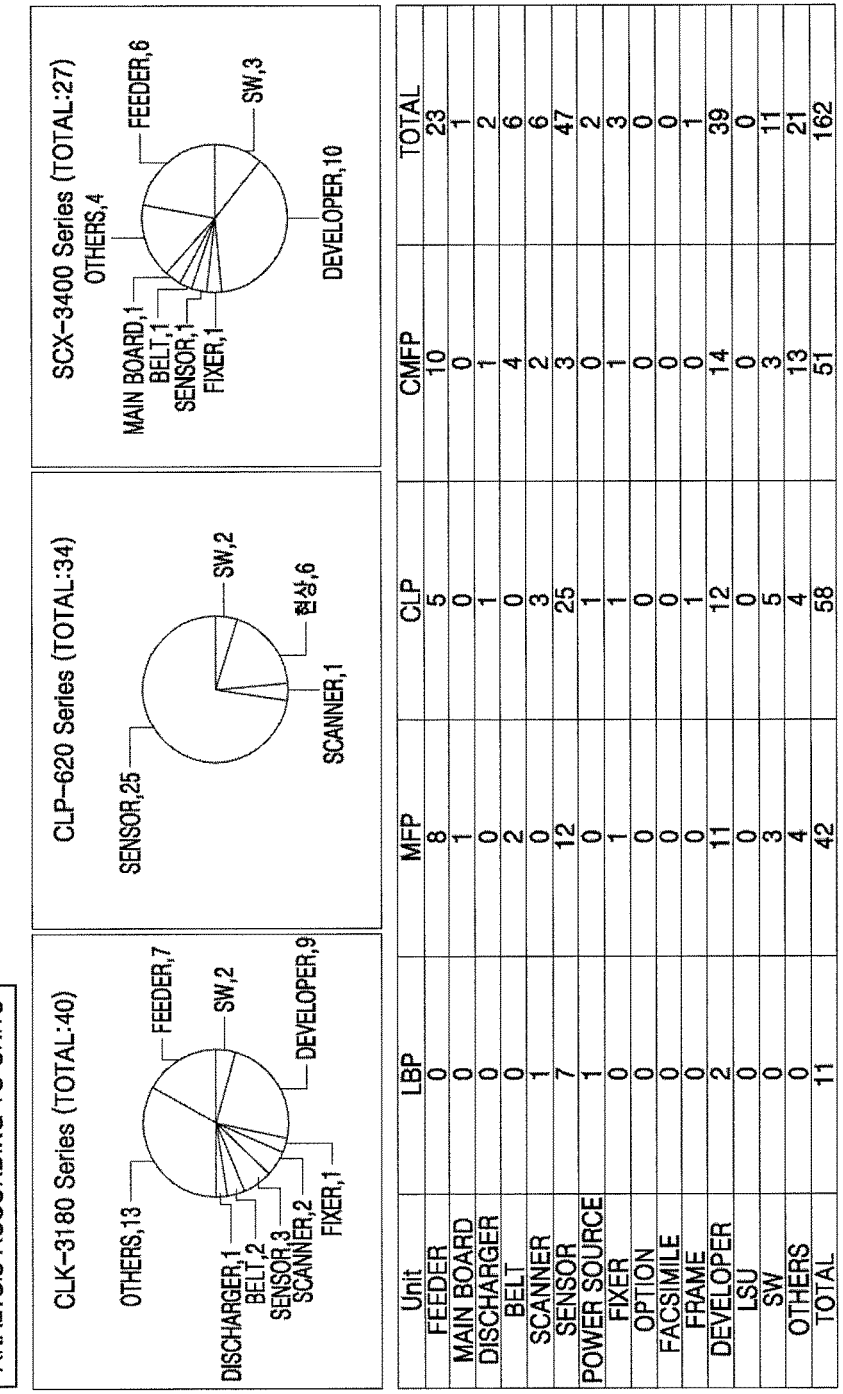
Figure 6C:
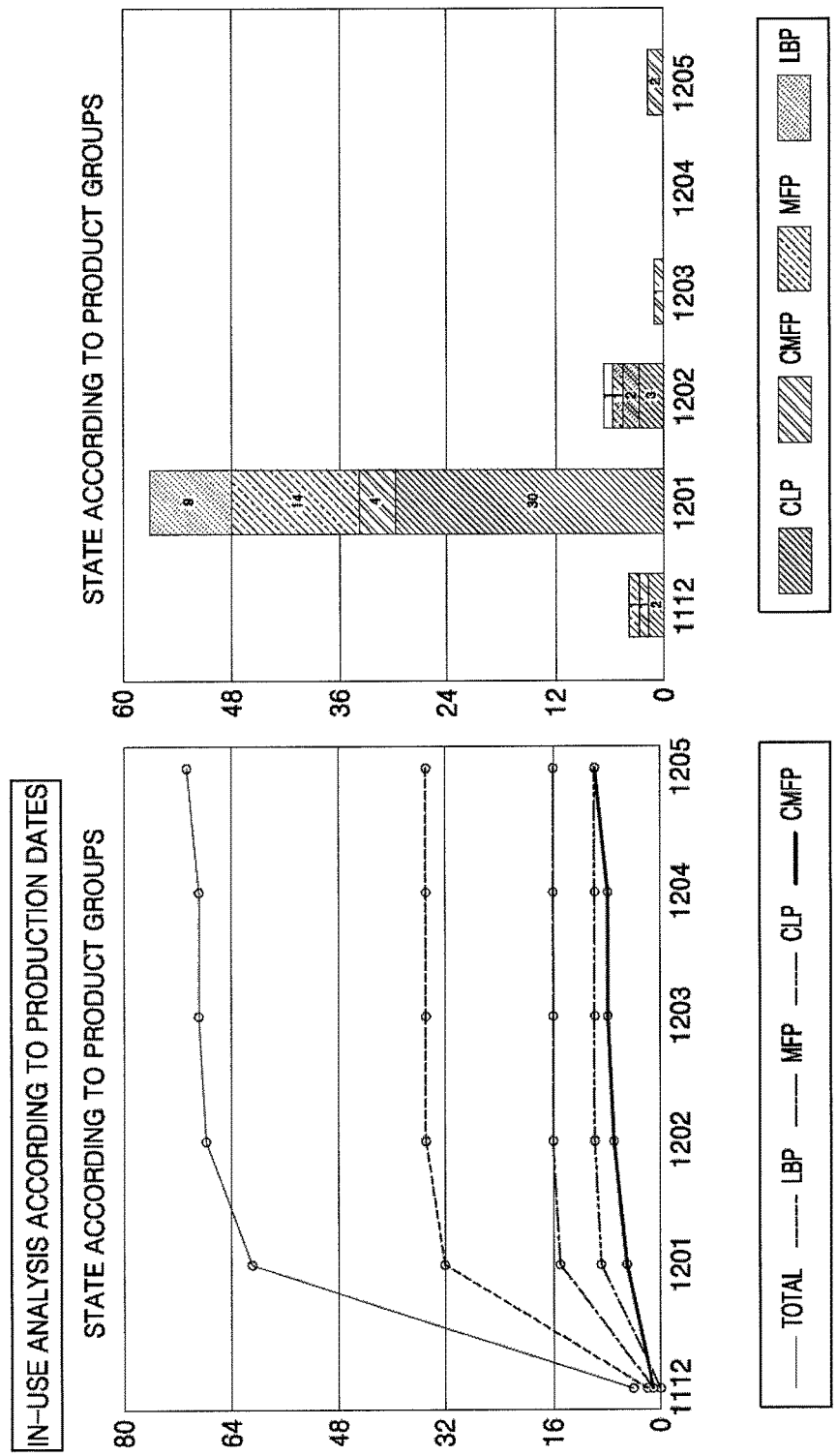
Figure 6D:
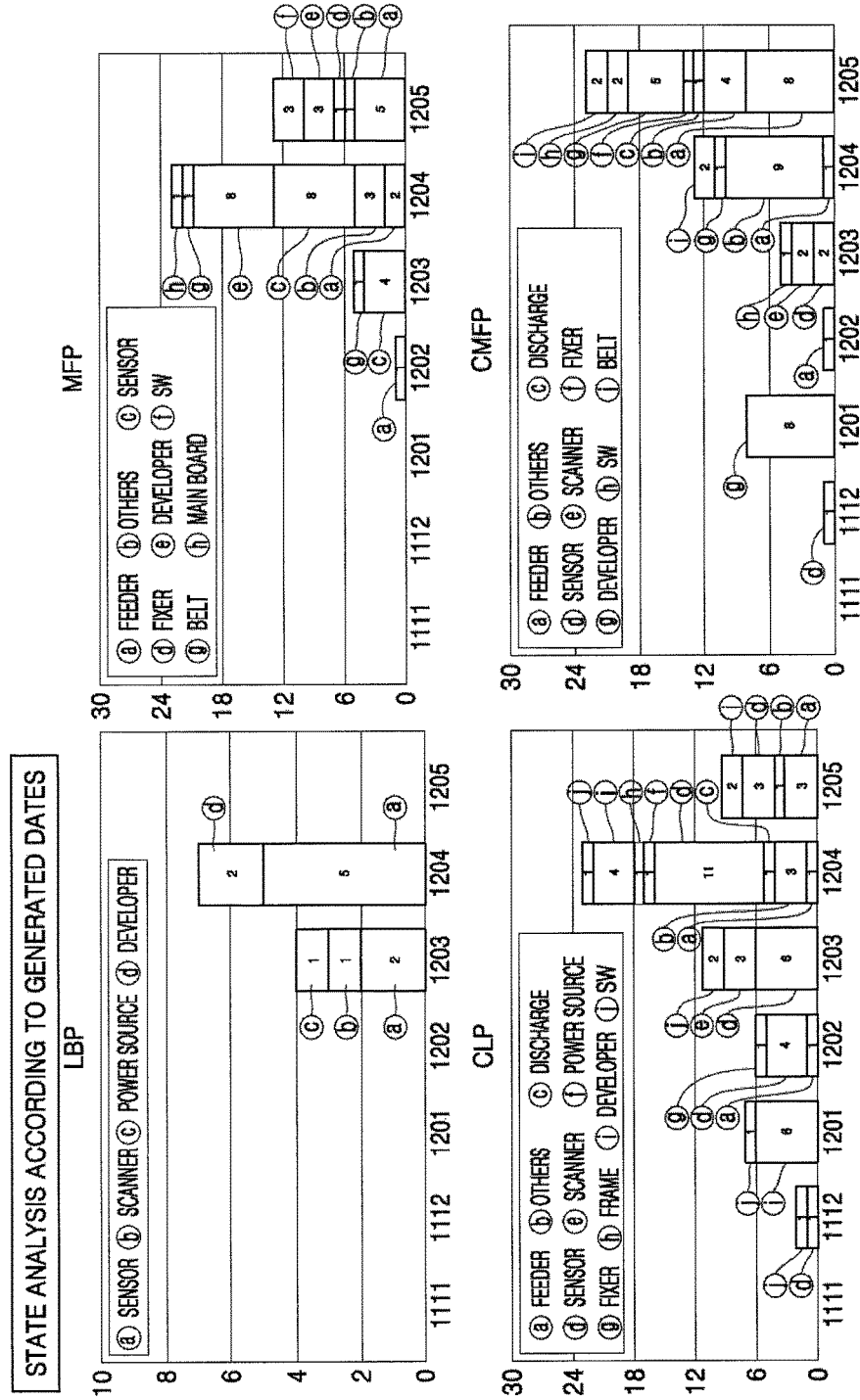

FIG. 6A illustrates results of analyzing error states and types of errors according to product groups and units. FIG. 6B illustrates results of analyzing types and numbers of errors generated according to units. FIG. 6C illustrates results of analyzing product groups where errors are generated according to production dates. FIG. 6D illustrates results of analyzing types and numbers of errors generated according to generated dates of the errors with respect to each production group.

In FIGS. 6A through 6D, "LBP" denotes a laser beam printer, "MFP" denotes a multi-function printer, "CLP" denotes a color laser printer, and "CMFP" denotes a color multi-function printer.

Examples of analyzing management information are shown in FIGS. 6A through 6D, but the examples are not limited thereto, and the management information may be analyzed via any one of various methods based on required information, and results of the analysis may be displayed.

FIGS. 7 through 11 are flowcharts illustrating a method of managing an image forming apparatus through a network, according to embodiments of the present invention. The method will now be described in detail with reference to FIGS. 7 through 11.

Figure 7:
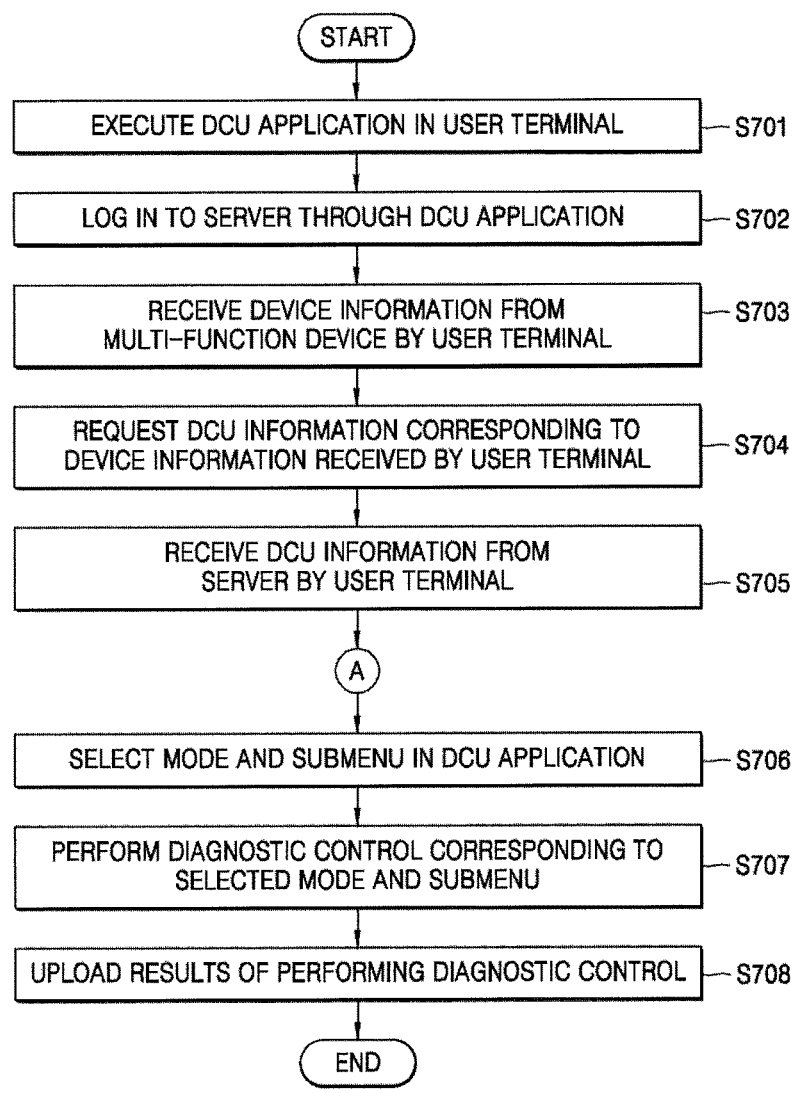
FIGS. 7 through 11 are flowcharts illustrating a method of managing an image forming apparatus through a network, according to embodiments of the present invention.

Referring to FIG. 7, a DCU application is executed in a user terminal in operation S701. The DCU application is an application for performing a diagnostic control on a multi-function device or the like, and may be developed and provided by a manufacturer of the multi-function device. When the DCU application is executed, a user logs in to a server through the DCU application in operation S702. A user authentication process is performed during the log in, wherein a user ID and a password are received from the user and it is determined whether the received user ID and password match those stored in the server. Meanwhile, if a version of the DCU application installed in the user terminal does not match a version supported by the server, the DCU application may be automatically updated.

When the user authentication process succeeds and thus the log in is completed, the user terminal receives device information of the multi-function device from the multi-function device in operation S703. Here, the device information is a series of information related to the multi-function device, and may include a device capability, a configuration, an EDC code, count information, error information, supplies information, and engine margin information.

Upon receiving the device information, the user terminal requests the server for DCU information corresponding to the device information in operation S704, and receives the DCU information from the server in operation S705.

Here, the DCU information is information required for the DCU application to perform the diagnostic control on the multi-function device. In other words, the DCU information is information required to perform each mode of the DCU application. The DCU information differs according to devices on which the diagnostic control is to be performed. Accordingly, in order to obtain the DCU information, the device information of the multi-function device currently connected to the user terminal is required. When the user terminal requests for the DCU information based on the device information, the server transmits the DCU information corresponding to the device information to the user terminal.

The DCU information may include a database of details and corrective measures of errors corresponding to various error codes, sample patterns for test printings, information for diagnosing each unit of the multi-function device, and various types of information related to the multi-function device. The DCU application may perform each mode by using the DCU information.

Then, when any one of modes of the DCU application is selected and any one of submenus of the selected mode is selected in operation S706, the DCU application performs a diagnostic control corresponding to the selected mode and submenu in operation S707. When the diagnostic control is completed, the user terminal uploads results of performing the diagnostic control in the server in operation S708. The uploaded results may be used as raw data for analyzing information, such as an error, later.

Meanwhile, detailed operations of the DCU application differ according to selected modes and submenus, as will be described below with reference to FIGS. 8 through 11.

Figure 8:
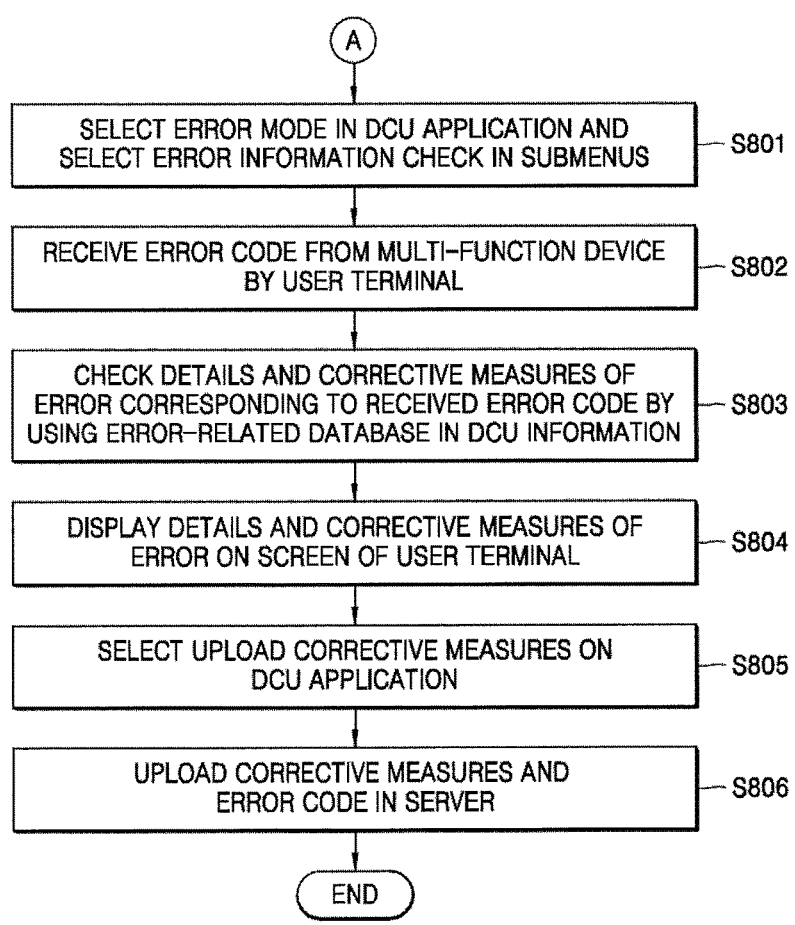

Referring to FIG. 8, when the user is to check an error generated in the multi-function device and corrective measures of the error, the user selects an error mode in the DCU application and selects error information check from submenus of the error mode in operation S801. In operation S802, the user terminal receives an error code from the multi-function device. In operation S803, the DCU application checks details and corrective measures of an error corresponding to the received error code. Here, an error-related database included in the DCU information received from the server is used. The error-related database stores details and corrective measures of errors corresponding to various error codes.

In operation S804, the user terminal displays the details and corrective measures of the error on a screen. The user may check the details of the error displayed on the user terminal and perform the corrective measures on the multi-function device. When the user selects upload corrective measures on the DCU application in operation S805 after performing the corrective measures, the user terminal displays a screen for receiving the corrective measures. Upon receiving the corrective measures performed by the user, the user terminal uploads the received corrective measures and the error code in the server in operation S806.

Figure 9:
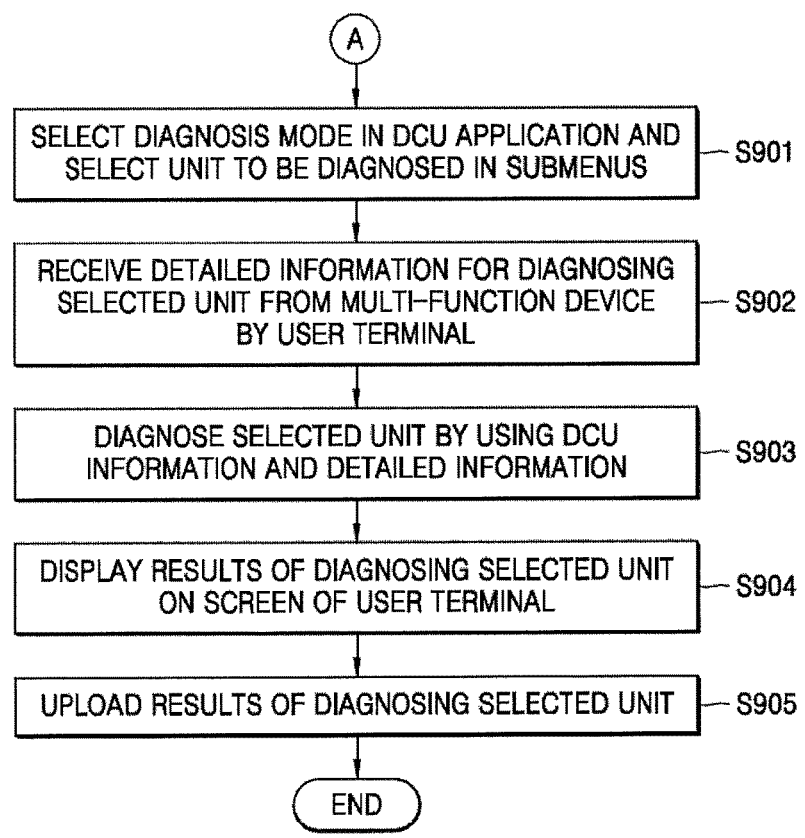

Referring to FIG. 9, when the user is to diagnose whether each unit of the multi-function device normally operates, the user selects a diagnose mode in the DCU application and selects a unit to be diagnosed from submenus, in operation S901. In operation S902, the user terminal requests the multi-function device for detailed information to diagnose the selected unit, and receives the detailed information. Then, in operation S903, the user terminal diagnoses the selected unit by using the DCU information and the detailed information. The DCU information may include information required to diagnose each unit of the multi-function device.

In operation S904, the user terminal displays results of diagnosing the selected unit on the screen. The user may check through the results whether each unit of the multi-function device normally operates. Then, in operation S905, the user terminal uploads the results in the server.

Figure 10:
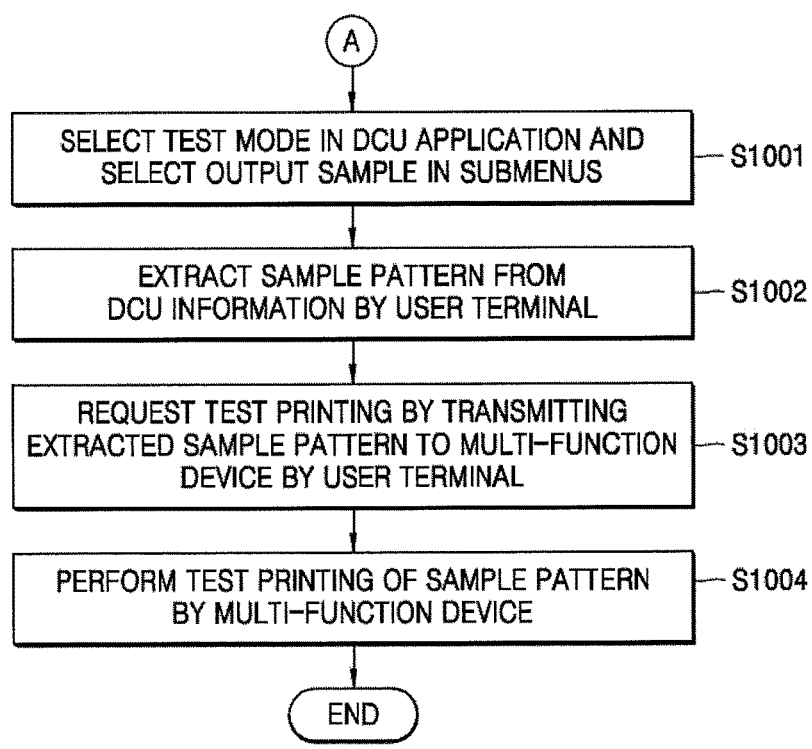

Referring to FIG. 10, when the user is to perform a test printing to check whether the multi-function device normally operates, the user selects a test mode in the DCU application and selects output sample in submenus in operation S1001. The user terminal extracts a sample pattern from the DCU information received from the server in operation S1002, and then requests for the test printing by transmitting the extracted sample pattern to the multi-function device in operation S1003. Upon receiving the sample pattern and the request for the test printing, the multi-function device performs the test printing in operation S1004.

Figure 11:
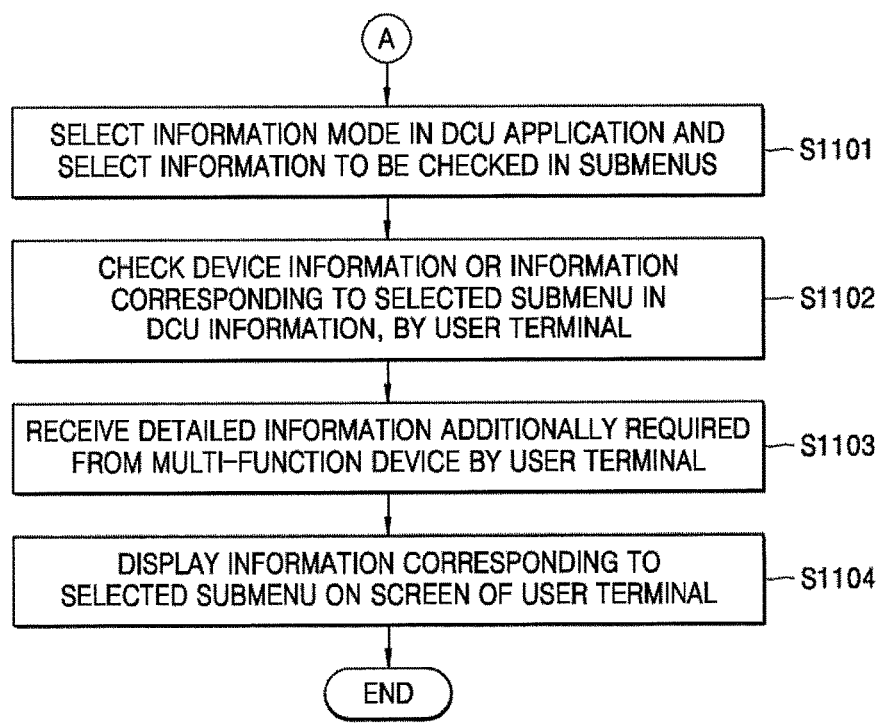

Referring to FIG. 11, when the user is to check various types of information of the multi-function device, the user selects an information mode in the DCU application and selects information to be checked in submenus in operation S1101. In operation S1102, the user terminal checks the device information received from the multi-function device or information corresponding to the selected submenu from the DCU information received from the server. The device information and the DCU information may include various types of information of the multi-function device. If additional information is required to check the information corresponding to the selected submenu, the user terminal requests the multi-function device for the detailed in operation in operation S1103, and displays the information corresponding to the selected submenu on the screen in operation S1104. The user may check information of the multi-function device through the information displayed on the screen.

As described above, by performing a diagnostic control on an image forming apparatus through a DCU application by using a user terminal, storing results of the diagnostic control in a server, and analyzing the results based on various standards, information of the image forming apparatus may be managed in various situations, a user may conveniently check the information of the image forming apparatus, and if an error is generated, the user may check corrective measure to quickly handle the error.

According to one or more embodiments of the present invention, a user may execute a DCU application in a user terminal to conveniently diagnose and manage an image forming apparatus.

Specifically, when an error is generated in the image forming apparatus, the user may check and perform corrective measures of the error through the DCU application executed in the user terminal connected to the image forming apparatus and a server through a network, thereby reducing time consumed to resolve the error.

Also, by storing information about errors generated in the image forming apparatus in various situations and corrective measures of the errors in the server through the network, and analyzing the stored information later, results of analysis according to various standards may be obtained and fundamental solutions on the errors generated in the image forming apparatus may be found.

While this invention has been particularly shown and described with reference to embodiments thereof, it will be understood by those of ordinary skill in the art that various changes in form and details may be made therein without departing from the spirit and scope of the invention as defined by the appended claims. The embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of a user terminal communicatively coupled to a server and an image forming apparatus for controlling diagnosis of the image forming apparatus, the method comprising:
   logging in to the server through a diagnostic control application executing on the user terminal;
   receiving device information of the image forming apparatus from the image forming apparatus;
   receiving, from the server, diagnostic control information corresponding to the received device information;
   performing a diagnostic control on the image forming apparatus, in response to a selection of a mode, among at least one mode including any one or more of an error mode, a diagnosis mode, a test mode, an information mode, or a service mode, through the diagnostic control application of the user terminal, and according to an extraction, from the diagnostic control information received from the server, of information corresponding to the selected mode; and
   uploading results of the diagnostic control on the server for analysis of the uploaded results.

2. The method of claim 1, wherein the performing of the diagnostic control further comprises:
   receiving a selection on any one of submenus included in the selected mode;
   receiving detailed information corresponding to the selected submenu from the image forming apparatus; and
   analyzing the received detailed information based on the extracted information.

3. The method of claim 1, wherein the performing of the diagnostic control further comprises:
   receiving a selection on any one of submenus included in the selected mode; and
   transmitting a command corresponding to the selected submenu to the image forming apparatus by using the extracted information.

4. The method of claim 1, wherein the performing of the diagnostic control comprises:
   receiving, by the user terminal, an error code from the image forming apparatus;
   checking details and corrective measures of an error corresponding to the received error code based on an error-related database included in the diagnostic control unit information; and
   displaying the checked details and corrective measures on a screen of the user terminal.

5. The method of claim 1, wherein the device information comprises at least one of a device capability, a configuration, an engine diagnostic control code, count information, error information, consumable good information, and engine margin information of the image forming apparatus.

6. The method of claim 1, wherein the diagnostic control unit information is information required to perform the diagnostic control in an image forming apparatus that has the received device information.

7. The method of claim 6, wherein the diagnostic control unit information comprises at least one of a database storing details and corrective measures of errors corresponding to various error codes, sample patterns for test printings, and information for diagnosing each unit of the image forming apparatus.

8. The method of claim 1, wherein the logging in comprises:
 transmitting user information to the server upon receiving the user information through the diagnostic control application;
 performing user authentication by using the user information;
 determining whether a version of the diagnostic control application executed in the user terminal matches a version supported by the server; and
 when determined that the versions do not match, updating the version of the diagnostic control application executed in the user terminal.

9. A non-transitory computer-readable recording medium having recorded thereon a program for executing a method of claim 1.

10. A system to control diagnosis of image forming apparatuses through user terminals over a network, the system comprising:
 an image forming apparatus among the image forming apparatuses; and
 a server to serve diagnostic control unit information for the image forming apparatuses,
 wherein, when the user terminal logs in to the server and transmits device information of the image forming apparatus to the server, the server,
 transmits, to a user terminal, diagnostic control information corresponding to the device information, to cause the user terminal to provide a user interface to control a diagnostic control on the image forming apparatus, in response to a selection of a mode, among at least one mode including any one or more of an error mode, a diagnosis mode, a test mode, an information mode, or a service mode, through the user interface, and according to an extraction, from the diagnostic control information transmitted by the server to the user terminal, of information corresponding to the selected mode, and to upload results of the diagnostic control on the server for analysis of the uploaded results; and
 wherein, when the server receives a request for an analysis on the uploaded results, the server performs the analysis.

11. The system of claim 10, wherein the image forming apparatus transmits detailed information corresponding to a selected submenu included in the selected mode, to cause the user terminal to analyze the detailed information based on the extracted information.

12. The system of claim 10, wherein the image forming apparatus receives, from the user terminal using the extracted information, a command corresponding to a selected submenu included in the selected mode.

13. The system of claim 10, wherein the image forming apparatus transmits, to the user terminal, an error code, to cause the user terminal to check and display details and corrective measures of an error corresponding to the error code on the user interface based on an error-related database included in the diagnostic control information transmitted from the server to the user terminal.

14. The system of claim 10, wherein the device information comprises at least one of a device capability, a configuration, an engine diagnostic control code, count information, error information consumable good information, and engine margin information of the image forming apparatus.

15. The system of claim 10, wherein the diagnostic control information is information required to perform the diagnostic control on the image forming apparatus having the received device information.

16. The system of claim 15, wherein the diagnostic control information comprises at least one of a database storing details and corrective measures of errors corresponding to various error codes, sample patterns for test printings, and information for diagnosing each unit of the image forming apparatus.

17. The system of claim 10, wherein, the server updates a diagnostic control application providing the user interface, when a version of the diagnostic control application installed in the user terminal does not match a version supported by the server.

* * * * *

UNITED STATES PATENT AND TRADEMARK OFFICE
CERTIFICATE OF CORRECTION

PATENT NO. : 10,136,030 B2
APPLICATION NO. : 15/156783
DATED : November 20, 2018
INVENTOR(S) : Seung-jin Cho Page 1 of 1

It is certified that error appears in the above-identified patent and that said Letters Patent is hereby corrected as shown below:

In the Claims

In Column 14, Line 60, Claim 4, after "control" delete "unit".

In Column 15, Line 2, Claim 6, after "control" delete "unit".

In Column 15, Line 6, Claim 7, after "control" delete "unit".

In Column 15, Line 32, Claim 10, after "control" delete "unit".

Signed and Sealed this
Twenty-sixth Day of February, 2019

Andrei Iancu
*Director of the United States Patent and Trademark Office*